(12) United States Patent
Buxton et al.

(10) Patent No.: US 7,412,412 B2
(45) Date of Patent: Aug. 12, 2008

(54) NETWORK REVERSE AUCTION AND SPENDING ANALYSIS METHODS

(75) Inventors: Brad Buxton, Salt Lake City, UT (US); John Stapleton, Orem, UT (US); Frank Hosea, Salt Lake City, UT (US); Matt Egen, San Francisco, CA (US); Dave Nash, Salt Lake City, UT (US); Dan Alger, Roy, UT (US); John Garvin, San Francisco, CA (US); Claire Butkus, Summit Park, UT (US); Trajan King, Salt Lake City, UT (US); Maria Dobson, Salt Lake City, UT (US); Gilbert Willoughby, Salt Lake City, UT (US)

(73) Assignee: Avotus Inc., Mississauga, Ontario (CA)

( * ) Notice: Subject to any disclaimer, the term of this patent is extended or adjusted under 35 U.S.C. 154(b) by 722 days.

(21) Appl. No.: 09/781,937

(22) Filed: Feb. 12, 2001

(65) Prior Publication Data

US 2002/0111889 A1  Aug. 15, 2002

(51) Int. Cl.
*G06Q 40/00* (2006.01)
(52) U.S. Cl. ...................................................... 705/35
(58) Field of Classification Search .................... 705/35
See application file for complete search history.

(56) References Cited

U.S. PATENT DOCUMENTS

| | | | | |
|---|---|---|---|---|
| 4,726,056 A * | 2/1988 | An et al. | ................ | 379/114.01 |
| 5,027,388 A | 6/1991 | Bradhaw et al. | ............ | 379/112 |
| 5,287,270 A | 2/1994 | Hardy et al. | ................ | 364/408 |
| 5,325,290 A | 6/1994 | Cauffman et al. | ........... | 364/401 |
| 5,659,601 A | 8/1997 | Cheslog | ...................... | 455/406 |
| 5,802,502 A | 9/1998 | Gell et al. | ...................... | 705/37 |
| 5,842,174 A | 11/1998 | Yanor | ............................. | 705/1 |
| 5,884,284 A | 3/1999 | Peters et al. | .................. | 705/30 |
| 5,930,773 A | 7/1999 | Crooks et al. | ................. | 705/30 |

(Continued)

OTHER PUBLICATIONS

Culloton, Dan. Going, going . . . Mastro Fine Sports of Oak Brook takes auctions to another level. Daily Herald. Arlington Heights, Illinois. Apr. 26, 1999. p. 1.*

(Continued)

*Primary Examiner*—James A Kramer
*Assistant Examiner*—Jason Borlinghaus
(74) *Attorney, Agent, or Firm*—Maldjian & Fallon LLC; John P. Maldjian (57) ABSTRACT

A computer-implemented telecommunications spending analysis system extracts telecommunications traffic detail data from billing statements provided by telecommunications carriers and converts the traffic detail data to a generic data format for aggregation in a uniform customer traffic history database. The spending analysis system compares billed rates against estimated market prices stored in a best of class (BOC) database and notifies the user of possible cost savings attainable in a renegotiated contract. A web-based RFP system facilitates preparation of a request for proposals (RFP) and solicitation of vendors to bid on the RFP in an online reverse auction environment, both for telecommunications services and other commodities. The RFP system may access the uniform customer traffic history database to facilitate preparation of a traffic forecast of the RFP. Upon completion of an RFP auction, the RFP system updates the estimated market prices of the BOC database based on the vendor bids.

66 Claims, 6 Drawing Sheets

U.S. PATENT DOCUMENTS

| | | | | |
|---|---|---|---|---|
| 6,009,154 | A | 12/1999 | Rieken et al. | 379/114 |
| 6,023,500 | A | 2/2000 | Kearns et al. | 379/114 |
| 6,032,131 | A | 2/2000 | Vogel | 705/30 |
| 6,047,267 | A | 4/2000 | Owens et al. | 705/34 |
| 6,052,447 | A | 4/2000 | Golden et al. | 379/114 |
| 6,052,449 | A | 4/2000 | Chavez, Jr. | 379/114 |
| 6,058,170 | A | 5/2000 | Jagadish et al. | 379/114 |
| 6,072,493 | A | 6/2000 | Driskell et al. | 345/356 |
| 6,073,108 | A | 6/2000 | Peterson | 705/8 |
| 6,078,652 | A * | 6/2000 | Barak | 379/114.02 |
| 6,078,907 | A | 6/2000 | Lamm | 705/40 |
| 6,199,050 | B1 * | 3/2001 | Alaia et al. | 705/37 |
| 6,574,465 | B2 * | 6/2003 | Marsh et al. | 455/406 |
| 7,065,496 | B2 | 6/2006 | Subbloei et al. | |
| 2001/0032163 | A1 * | 10/2001 | Fertik et al. | 705/37 |
| 2001/0039529 | A1 * | 11/2001 | Hoffman | 705/37 |
| 2001/0051918 | A1 * | 12/2001 | Mason | 705/40 |
| 2002/0147674 | A1 * | 10/2002 | Gillman | 705/37 |
| 2003/0014326 | A1 * | 1/2003 | Ben-Meir et al. | 705/26 |

OTHER PUBLICATIONS

Goodyear, Mark. Enterprise System Architectures. CRC Press. Danvers, MA. Jan. 1, 2000. p. 32-15-32-18.*

Lee, Sul H. Vendor Evaluation and Acquisition Budgets. Haworth Press. Binghamton, NY. 1992. p. 114.*

* cited by examiner

NETWORK REVERSE AUCTION AND SPENDING ANALYSIS METHODS

TECHNICAL FIELD

This application relates to computer assisted methods for preparation of requests for proposals (RFP), dissemination of RFPs to vendors, collection of vendor proposals in an online reverse auction environment, analysis and selection of vendors, and analysis of spending; and, in particular, to such methods for use in bidding and contracting for telecommunications services, analysis of telecommunications spending, and management of telecommunications usage.

BACKGROUND OF THE INVENTION

Large corporations and other major users of telecommunications services often spend hundreds of millions of dollars on such services annually. These customers commonly use multiple telecommunications carriers to provide the services required for various types of traffic, such as, for example, voice, cellular, paging, and data transmission. Additional telecommunications carriers may be used for certain classes of service, such as calls and other traffic between specific locations or at certain times. Furthermore, multiple telecommunications carriers are commonly used for the exact same class of service, for purposes of introducing redundancy in the customer's telecommunications resources, and for other reasons. As used herein, the term "class of service" means a particular telecommunications service for transmitting voice, data, or other signals between two geographic locations. Each different type of traffic transmitted and each different origination and destination region for the traffic may constitute a unique class of service. Class of service definitions are primarily dependent upon how telecommunications carriers distinguish traffic for the purpose of applying different rates.

Large telecommunications customers typically employ analysts who review billing statements, perform audits, and request new telecommunications installation and services for the entire organization. Telecommunications analysts monitor the customer's telecommunications spending to identify overcharges and mistakes made by service providers and to minimize expenditures generally. To perform these tasks, the analyst reviews the detailed billing statements provided by carriers. Carriers commonly provide bills on a monthly basis in a computer-readable format, such as a CD-ROM, but may use other formats, such as paper, magnetic tape, EDI, and the World Wide Web.

Analyzing telecommunications billing statements can be burdensome due to the volume of information they include. This is especially true when multiple carriers are used, because the carriers do not typically use the same billing format or provide the same kinds of traffic information. Different carriers may also use different service class codes to identify the same class of telecommunications service, making it difficult to compare competitor rates. Furthermore, the data included in computer-readable billing statements may be stored in a nonstandard database format or may require special bill viewing software that is unique to the carrier. Due to the volume of call data and the different data formats, it is often too burdensome for an analyst to track all telecommunications traffic on a monthly basis. Consequently, many choose to merely perform audits in an attempt to avoid gross carrier overcharges and mistakes. Thus, a need exists for an improved method of monitoring and analyzing telecommunications spending.

Large telecommunications customers use their buying power to negotiate telecommunications services contracts having a desired balance of competitive rates and service plan features. To begin the negotiation process, historical call data is typically gathered by the customer, e.g., from past bills, and used to help forecast telecommunications needs for the duration of the proposed contract term. Since different telecommunications carriers deliver computer-readable billing data in different formats, the task of compiling historical use summaries and forecasting traffic is highly burdensome for a large company, especially a global company dealing in various languages and currencies. A large company may spend weeks or months compiling the necessary information and preparing telecommunications forecasts.

To further complicate the forecasting process, the information provided in carriers' standard billing formats make it very difficult to determine the actual rates applied to particular traffic. For example, a contract between a customer and a single carrier may specify 150 different rates for hundreds of different classes of voice traffic. Service contracts may also specify discounts applicable to only a few of the contract rates in particular circumstances, such as when a volume exceeds a predetermined target. Voice traffic classes may differentiate telecommunications traffic based on origination location, termination location, whether the traffic was incoming or outgoing, the time of the traffic event, and the rate schedule to be applied. Rates for a particular call may even vary during the duration of the call. However, service class designators are not typically listed in the billing formats used by most carriers. Also, while the service contract may clearly define the applicability of discounts, carrier bills often fail to clearly identify calls to which the discounts have been applied. Consequently, summarizing and analyzing billing information is a complicated task.

Once summary information has been gathered, the customer uses it to prepare a traffic forecast including the desired classes of service and anticipated quantity of traffic per class of service. The forecast telecommunications needs are then set forth in a request for proposals (RFP) that is distributed to potential telecommunications vendors. While the customer will typically seek the most competitive rates, other terms unrelated to rates may also be important. For example, the RFP may specify nonprice service plan features desired by the customer, such as the contract duration, renewal period, quality of service, refund policy, warranties, customer service response time, customer service escalation procedures, multilingual support services, e-mail response services, exclusivity terms, discounts, installation fees, risk allocation, contract renewal terms, and/or termination conditions. In response to the RFP, each interested vendor prepares a detailed proposal that represents a bid for the services or a portion thereof. Using traditional telecommunications RFP methods, the bidding period typically lasts a month or more. During the bidding period, each interested vendor submits a single proposal that represents the bidder's best shot at winning the business. Such proposals commonly include significant amounts of sales and advertising information, extensive legal terms, variations on the requested service (substitutions), and other details that make the proposal difficult to evaluate. For example, three proposals made in response to a medium size RFP valued at about $12 million recently took a team of 20 people an entire month to review and extract relevant bid information. The burden of the RFP process prompts many large telecommunications customers to hire independent consultants skilled in preparing RFPs and evaluating vendor proposals.

Once the vendor proposals have been collected and analyzed, the customer must choose one or more of the vendors to provide services to meet its telecommunications needs. Finalizing a service contract may involve negotiation and fine tuning of certain proposed contract terms.

To guarantee competitive rates, telecommunications services contracts may include minimum usage or spending commitments during the term of the contract. Such contract provisions impose penalties on customers that fail to meet the minimum use commitments. Once a contract is in place, a customer will want to monitor use relative to the minimum use commitments for budgeting purposes and to take corrective action (in addition to monitoring for overcharges and mistakes, as described above). If multiple carriers are used for the same type or class of service, the customer may be able to offset projected usage deficits under a contract with a first carrier by redirecting surplus call traffic from a second carrier. Some contracts may also allow rate adjustments to be made during their term. In some cases, the customer may be able to renegotiate the contract to avoid significant penalties.

Telecommunications rates have declined in recent years and are expected to continue dropping. The potential cost reductions made possible by downward market movement can justify incurring the expense of the RFP and contract negotiation process on a regular basis. The frequency by which a customer should put its traffic up for bid is partly a function of the rate at which the market is moving and the expense of the RFP process. Monitoring of usage can help the customer to determine when to next put its telecommunications traffic up for bid. In recent years, major telecommunications users have engaged in the RFP and contract negotiation process once every 12 to 36 months, although many would do so more frequently if the RFP process required less effort and expense.

Thus, a need exists for methods and systems for reducing the cost of the RFP process so that telecommunications customers can afford to put traffic up for bid more frequently. A need also exists for an improved method of monitoring telecommunications usage and costs relative to the market prices, to thereby improve the timing of the RFP process and reduce telecommunications spending.

SUMMARY OF THE INVENTION

In accordance with the present invention, a telecommunications spending analysis system involves computer software that extracts telecommunications traffic data from computer-readable billing statements provided by telecommunications carriers. The spending analysis system includes a predefined traffic classification conversion table that is used by the system to convert each carrier's telecommunications traffic detail to a generic billing data format. The generic billing data format allows the traffic details of different carriers' bills to be aggregated in a uniform customer traffic history database that can then be sorted and summarized as desired by the user.

The spending analysis system allows the user to summarize rates for each carrier based on the class of service provided. To help the user determine when to put its telecommunications traffic up for bid, the system preferably includes an RFP timing module that compares the user's actual rates to estimated market rates listed in a Best of Class (BOC) database. The BOC database includes commodity designations representing various classes of service and estimated market rate stored in association with the commodity designations. The estimated market rates can be kept current by manual updates or by the RFP and market database updating method described below. The BOC database is made available to users of the spending analysis system, preferably over the Internet via a subscription-based web site and only to the extent necessary to allow the user to compare rates for specific service classes included on the user's bills. By comparing the customer's actual telecommunications rates to the estimated market rates of the BOC database, the system facilitates efficient timing of the RFP process. The RFP timing module can be configured to notify the user when the projected cost savings attributable to current reductions in service rates is likely to outweigh the expense of the RFP and contract negotiation process.

In another aspect of the present invention, a method and system for preparing an RFP, collecting vendor proposals in an online reverse auction environment, and analyzing vendor proposals involves an interactive RFP web site. The RFP web site includes a secure customer account accessible by the customer for preparing an RFP by merely completing a web-based customer needs assessment and service level agreement (SLA) questionnaire. The RFP web site receives historical use data from the user, preferably by uploading it from the uniform customer traffic history database as created by the telecommunications spending analysis system. If the uniform customer traffic history database is unavailable, the customer can manually input historical use data. The RFP web site then uses the historical use data to automatically prepare a traffic forecast that the user can review and modify. The traffic forecast forms the core of the customer needs assessment. The customer also answers a series of predefined questions that establish the terms of a preferred SLA for the requested services, including non-price contract terms such as customer service levels, contract duration, and other non-price factors. After the customer has completed the customer needs assessment and SLA questions, the RFP system creates a web-based RFP response form that includes a series of predefined RFP questions grouped in sections. By default, the RFP web site assigns to each of the RFP questions and sections a weighting factor that represents the importance of each of the RFP questions and sections to the customer's decision process. These weighting factors are adjustable by the customer.

The customer is also prompted by the RFP system to identify potential vendors who will be invited to participate in bidding on the RFP. A reference checking subsystem of the RFP system may be activated by the customer for obtaining information about the potential vendors. The reference checking subsystem requires the potential vendors to supply the names and email addresses of one or more reference individuals. An email request is then automatically generated by the reference checking subsystem and sent to the reference individuals. The email request asks the reference individuals to access the reference checking subsystem and provide feedback on the potential vendor. As part of the RFP preparation process, the reference checking subsystem prompts the customer to select and/or define reference feedback questions that will be displayed to the reference individuals when they access the RFP system to provide feedback. As with the RFP questions, the customer can weight the reference feedback questions so that the reference individuals' answers to them will be included in the evaluation of vendor bids.

After the RFP preparation process is complete, the RFP response form is made available to the potential vendors via a secure RFP web server that includes a reverse auction environment. An account name and password is assigned to each potential vendor to ensure access to the reverse auction is by invitation only. The password access allows vendor proposals to be submitted in a secure manner and made available only to the customer. Interested vendors submit their proposals by completing the RFP questions on the customer-defined RFP response form and entering proposed rates for the classes of telecommunications traffic that are up for bid. Because proposals must be submitted in an online forms environment, they are relatively uniform, which allows them to be easily summarized, evaluated, and transmitted by the customer. The on-line reverse auction environment can also facilitate interaction between interested vendors and the customer via email or an electronic bulletin board, for clarification of the RFP and tailoring of responses to the customer's needs.

The reverse auction environment enables the RFP system to provide feedback to bidders by comparing their bid proposals to those of other bidders. To promote competitive bidding between interested vendors, the customer may choose to have the RFP system rank the vendors' bids against those of other interested vendors and to display the rankings to the interested vendors. Each vendor may submit multiple bids during the auction in an attempt to improve its ranking relative to other vendors. During the course of the auction, interested vendors can access, modify, and resubmit a previous bid. An interested vendor can also monitor the status of the auction in real time to determine whether to submit a modified bid. To this end, an email notification subsystem can be used to notify interested vendors when they have been outbid by another interested vendor.

In another aspect of the present invention, a method of updating the BOC database is integrated with the RFP system and reverse auction environment. Upon completion of each reverse auction, the system can update the BOC database with the best bid made during the auction for each class of service. In updating the BOC database, the method involves evaluating the age of the estimated market price data stored in the BOC database to determine whether an update is appropriate. Since rate information may be volume dependent, the BOC database can include best rate information for several different ranges of traffic volumes. The BOC database can also include best non-price contract terms and conditions, such as contract duration and service levels.

In yet another aspect of the invention, the RFP systems and methods described above are applied to purchase and analyze usage of commodities other than telecommunications services. As used herein, "commodities" means products, services, or a combination thereof. For example, products such as computers, networking devices, telephones, and office equipment may be included in the RFP for bidding by interested vendors. Because some vendors sell both telecommunications services and other products (telephones, switches, etc.), the RFP system can also be used for soliciting bids on packages of telecommunications services and other products.

Additional aspects and advantages of this invention will be apparent from the following detailed description of preferred embodiments thereof, which proceeds with reference to the accompanying drawings.

DETAILED DESCRIPTION OF PREFERRED EMBODIMENT

Figure 1:
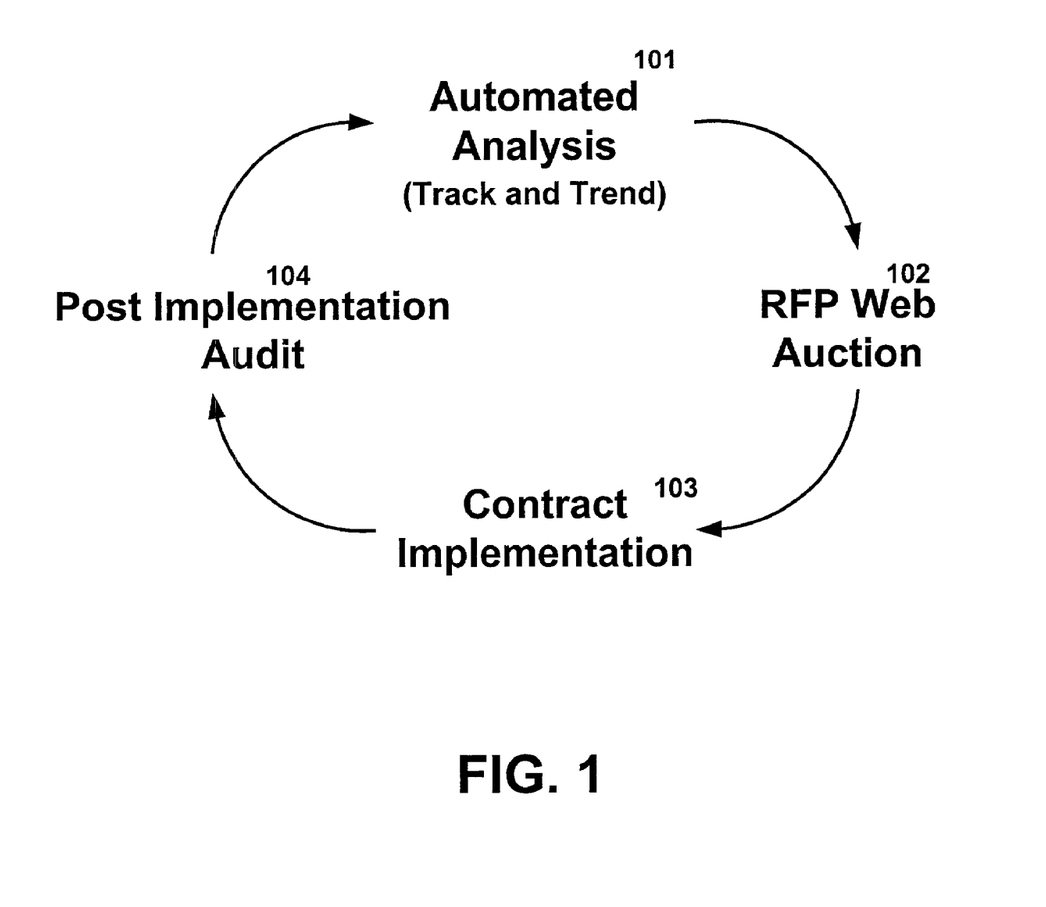
FIG. 1 is a diagram illustrating a telecommunications contracting life cycle in accordance with the present invention.
Figure 2:
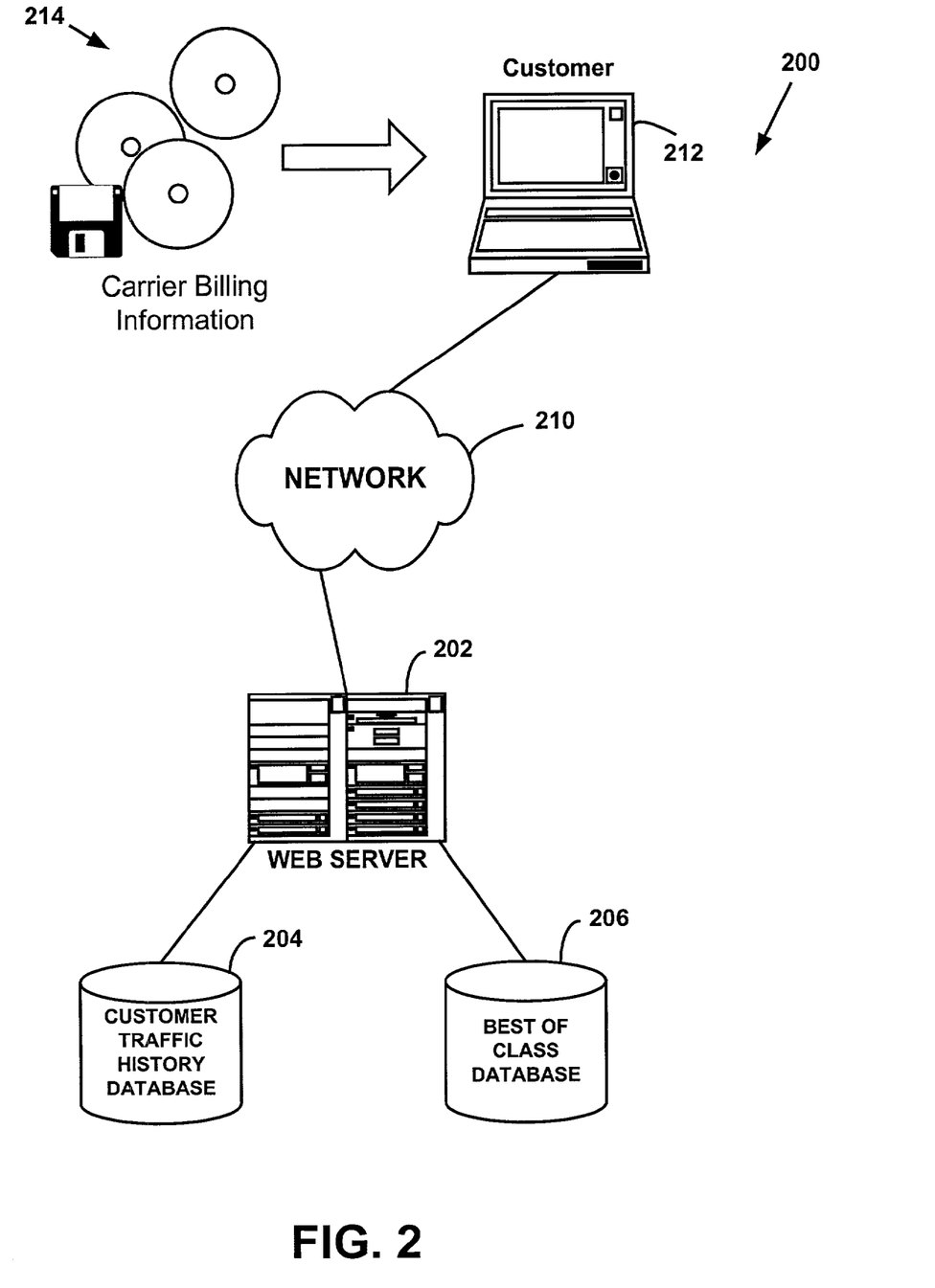
FIG. 2 is a schematic diagram showing the components of a telecommunications spending analysis system in accordance with the present invention.

FIG. 1 is a diagram illustrating a telecommunications contracting life cycle in accordance with the present invention. With reference to FIG. 1, a telecommunications customer first analyzes its spending 101 using an automated telecommunications spending analysis system 200 (FIG. 2). The customer puts its traffic up for bid, when desired, by preparing a request for proposals (RFP) and soliciting bids from interested vendors in a reverse auction environment 102. In the preferred embodiment, described in detail below, the reverse auction environment is implemented for remote access via the Internet using a web browser. Once the RFP web auction is complete, the customer selects a vendor and implements a contract 103. Following contract implementation, the customer audits bills for compliance with the contract terms 104. Thereafter, the customer completes the telecommunications contracting life cycle by resuming automated analysis of its spending.

Spending Analysis System

FIG. 2 is a schematic diagram of a telecommunications spending analysis system 200 in accordance with a preferred embodiment of the present invention. With reference to FIG. 2, spending analysis system 200 includes a web server 202 that serves as a front end to a customer traffic history database 204 and a best of class database 206 (BOC database). Web server 202 includes software for generating web pages; for querying databases 204, 206; and for updating databases 204, 206. In an alternative embodiment (not shown), spending analysis system 200 includes a data server that serves as a back end of the system for handling database queries from web server 202; serving data to web server 202; and updating databases 204, 206 in response to update requests from web server 202. Web server 202 is connected to a network 210 such as the Internet to allow remote access by customers. An analysis software module operates on a customer computer 212 for extracting billing data from carrier bills 214, which are received from the customer's telecommunications carriers in various formats and on various media, such as CD-ROM, magnetic media, and paper. Customer computer 212 is preferably a personal computer running the Windows operating system, but other types of personal computers and other types of general purpose computers capable of operating a web browser can also be used.

As described above in the Background of the Invention section, carrier bills typically include the customer's telecommunications traffic detail in a special or proprietary format that is readable by bill viewing software provided by the carrier. Often the bill viewing software is a self-launching program that is included on the same disk with the billing data itself.

Figure 3:
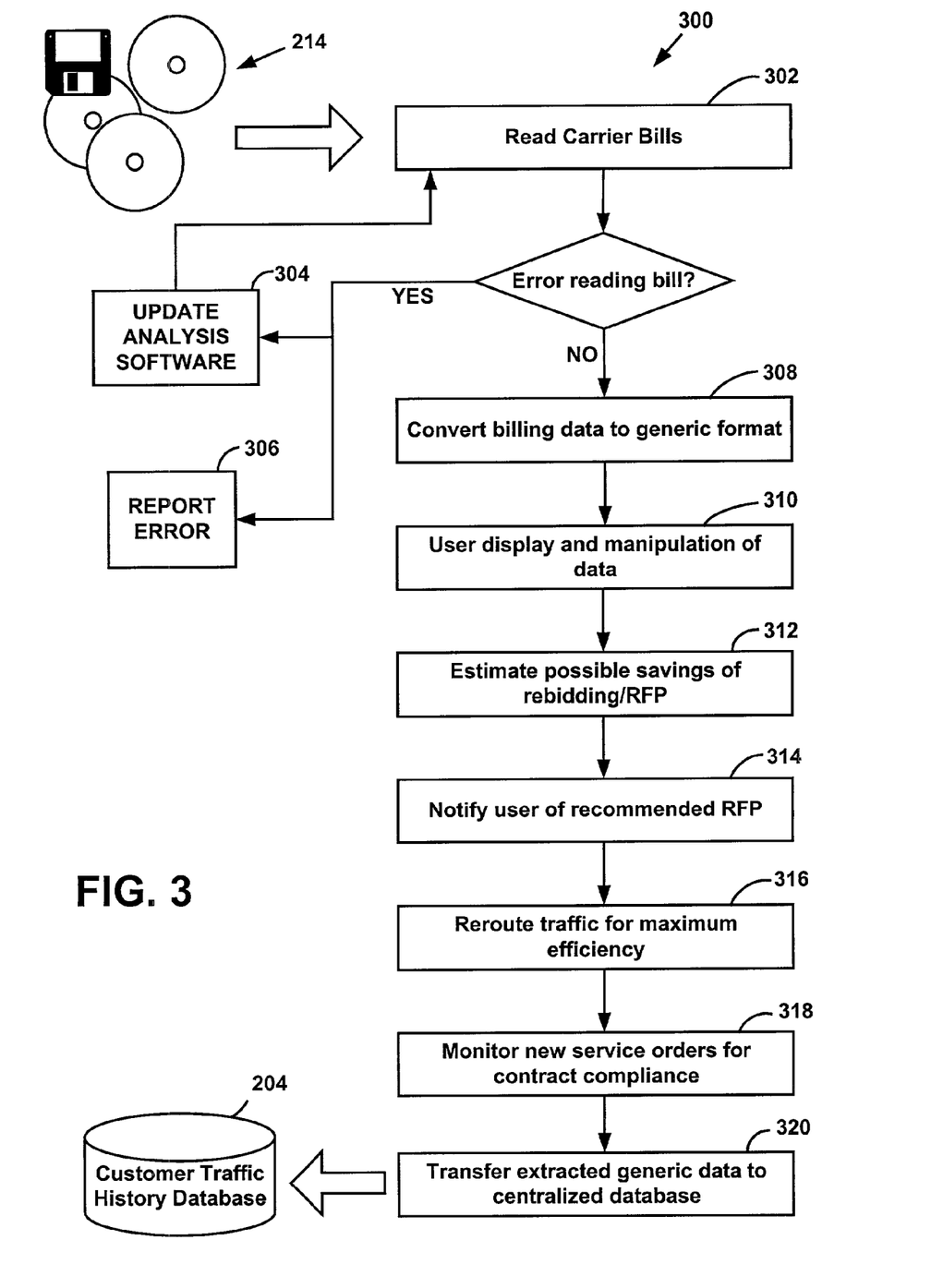
FIG. 3 is a flow diagram depicting the steps involved in using the telecommunications spending analysis system of FIG. 2.

FIG. 3 is a flow diagram depicting a method 300 in accordance with the present invention for extracting, summarizing, and analyzing carrier bills 214 using spending analysis system 200 of FIG. 2. With reference to FIGS. 2 and 3, a telecommunications customer runs the analysis software on customer computer 212. The analysis software reads telecommunications traffic detail data from carrier bills 214 (step 302). Preferably, the analysis software reads traffic detail data directly from the billing CDs and disks, but can also be configured to access the billing data using components of the carriers' custom bill viewing software as middleware. If the analysis software encounters an unknown data format or traffic type code in the carrier bill, it will prompt the user to install an updated version of the analysis software (step 304), which may be available for download from web server 202. To facilitate maintenance of the analysis software, unknown data formats and type codes cause the software to launch an error reporting routine (step 306) that reports errors to software development personnel who are responsible for telecommunications spending analysis system 200. In an alternative embodiment (not shown), the analysis software can be configured to automatically report data extraction errors via web server 202 for review by software development personnel.

A traffic genericizing module of the analysis software converts extracted billing data to a generic traffic format according to a set of translation rules (step 308). A different set or subset of translation rules is generally applicable to each vendor, such as, for example, AT&T™, MCI™, and SPRINT™. The translation rules relate billed traffic detail data to the generic traffic format based on a class of service of each traffic event. The class of service of each traffic event can be ascertained from the following four pieces of information, which can be obtained from the billing detail: (1) whether the traffic is incoming or outgoing, (2) the type of service (e.g. voice, data, paging, cellular), (3) the boundary type (e.g., interstate, inter-LATA, international), and (4) the rate schedule applicable to the service. The translation rules are preferably defined in the analysis software itself, but could also be stored remotely, for example, on web server 202 of spending analysis system 200.

Once translated to the generic format, the traffic detail can be summarized, sorted, combined with data from other carriers, and compared to estimated market rates available from BOC database 206. The analysis software allows the user to display and manipulate the generic customer traffic history data in a variety of ways (step 310). Conversion of the billing data to the generic format is necessary because data from different carriers, if aggregated in its original format, cannot be manipulated or compared to market rates.

The analysis software can also estimate when the traffic should be put up for bid (step 312) by comparing the customer's rates and traffic volume to the estimated market rates on BOC database 206 and then weighing the potential benefit of decreased rates against the cost of engaging in the RFP process. If efficiencies are predicted by the analysis software, it can automatically notify the user of the opportunity to reduce costs by putting its traffic up for bid (step 314).

In addition to analyzing traffic data for rate information, the analysis software can be configured to monitor the customer's compliance with various telecommunications contract terms. For example, if a contract specifies that the customer must use a minimum target quantity of a particular class of service in order for a discounted rate to apply, the analysis software can be configured by the user to monitor whether it is on track for meeting or exceeding the volume target. If a projected deficit on one carrier is identified by the analysis software, it will suggest rerouting of surplus traffic from another carrier (step 316). Because the analysis software monitors traffic over multiple carriers, it can also suggest strategies for rerouting traffic to take advantage of special rates for maximum efficiency. Algorithms in accordance with known practices are included in the analysis software for minimizing costs on the basis of these and other factors.

The analysis software can also monitor whether new services initiated during the billing period were installed and billed in accordance with contract terms (step 318). For example, a contract may specify that digital subscriber lines (DSL) are to be installed for a fixed fee and thereafter be subject to a special rate. However, when ordering the DSL line the customer must reference the contract in order to be eligible for the fixed installation fee and special rate. In this example, the analysis software can be configured to monitor whether the price of new DSL installations exceeds the contract price. If so, then the customer is notified so that it can take corrective action. The analysis software can also be configured to send a message to the carrier identifying the installation fee discrepancy and requesting correction. Under some contracts, the customer can work with the carrier to rectify the error, but only if it is identified within a certain period of time. The analysis software thus facilitates timely identification and correction of service order errors.

Periodically, the traffic detail extracted from carrier bills 214 by customer computer 212 is transferred to customer traffic history database 204 for centralized storage and analysis (step 320). The customer's traffic history data is thus always available and conveniently ready for use in an RFP system 400 (FIG. 4), described below.

In a second preferred embodiment analysis system (not shown), customers authorize their telecommunications carriers to send traffic detail directly to a centralized traffic history database service. The traffic data may be sent electronically via EDI, FTP, HTTP, XML, or otherwise; or delivered on a data storage medium for uploading to customer traffic history database 204. The participating customer can then access and analyze its traffic data via network 210 by accessing a secure account on a web site hosted on web server 202.

RFP System and Auction

Figure 4:
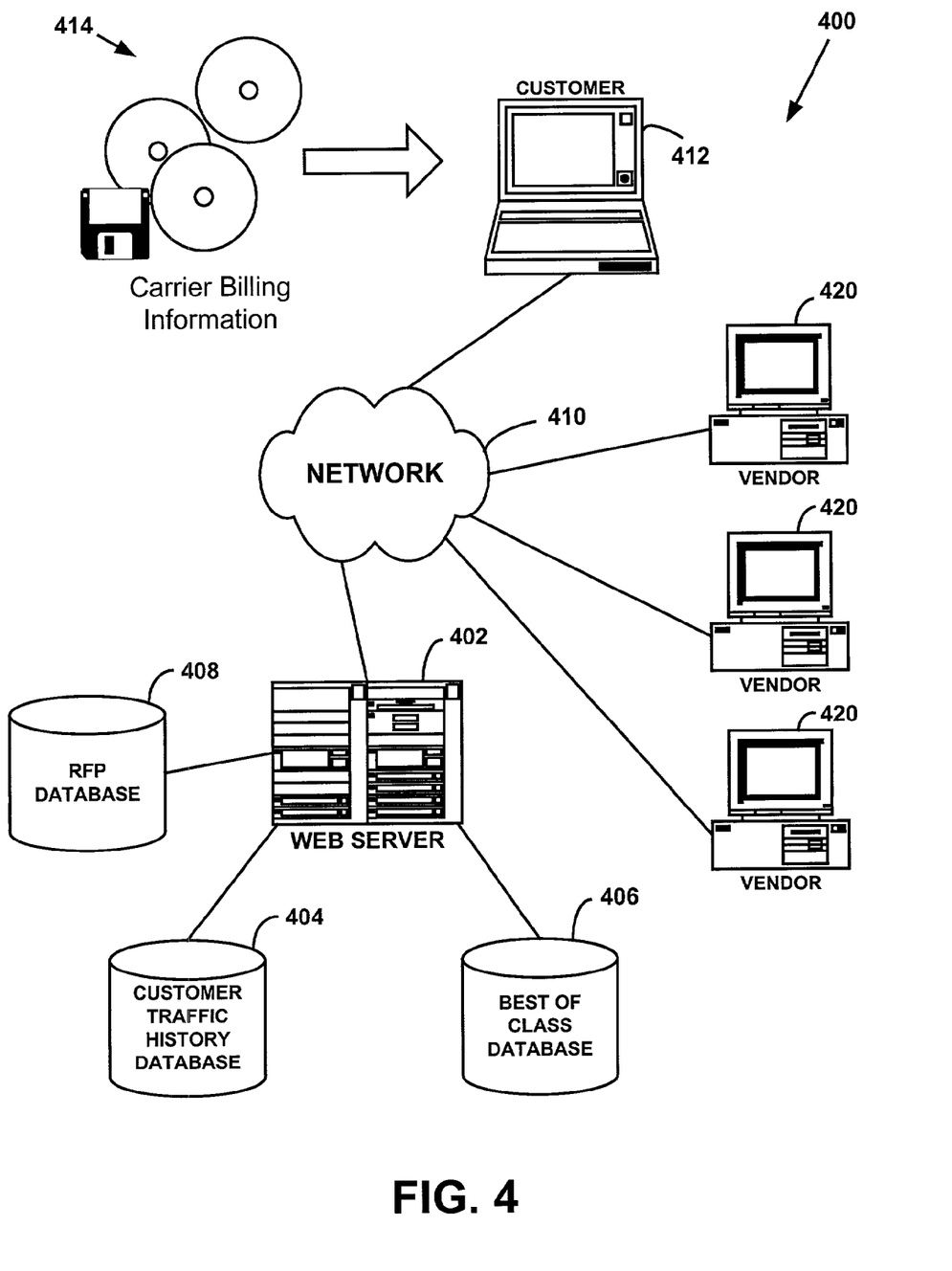
FIG. 4 is a schematic diagram showing the components of an RFP system in accordance with the present invention.

FIG. 4 is a schematic diagram showing the components of a preferred embodiment RFP system 400 in accordance with the present invention. With reference to FIG. 4, RFP system 400 is similar in arrangement to spending analysis system 200, in that it includes an RFP web server 402, a customer traffic history database 404, and a Best of Class (BOC) database 406 all accessible over a network 410, such as the Internet. Additionally, RFP system 400 includes an RFP database 408 for storing information pertaining to the RFP process. For clarity, the databases 204, 206, 404, 406, and 408, are all shown separately. However, it will be understood by those skilled in the art that the databases 204, 206, 404, 406, and 408 could easily be combined in a single database, on multiple databases stored on the same computer system, or distributed to different computers for access over networks 210, 410. RFP web server 402 can be integrated with web server 202 or implemented on a separate computer in communication with web server 202 over a network. In a preferred embodiment, RFP system 400 is combined with spending analysis system 200. As described below, RFP system 400 is accessible over network 410 using a customer computer 412 to create and release an RFP using RFP web server 402. Customer computer 412 may include software, such as the analysis software of spending analysis system 200, for extracting traffic data from carrier bills 414 and uploading it to customer traffic history database 404 for use in the RFP preparation process described below. Once an RFP has been set up and released for bidding, vendors can access RFP web server 402 via network 410.

Figure 5:
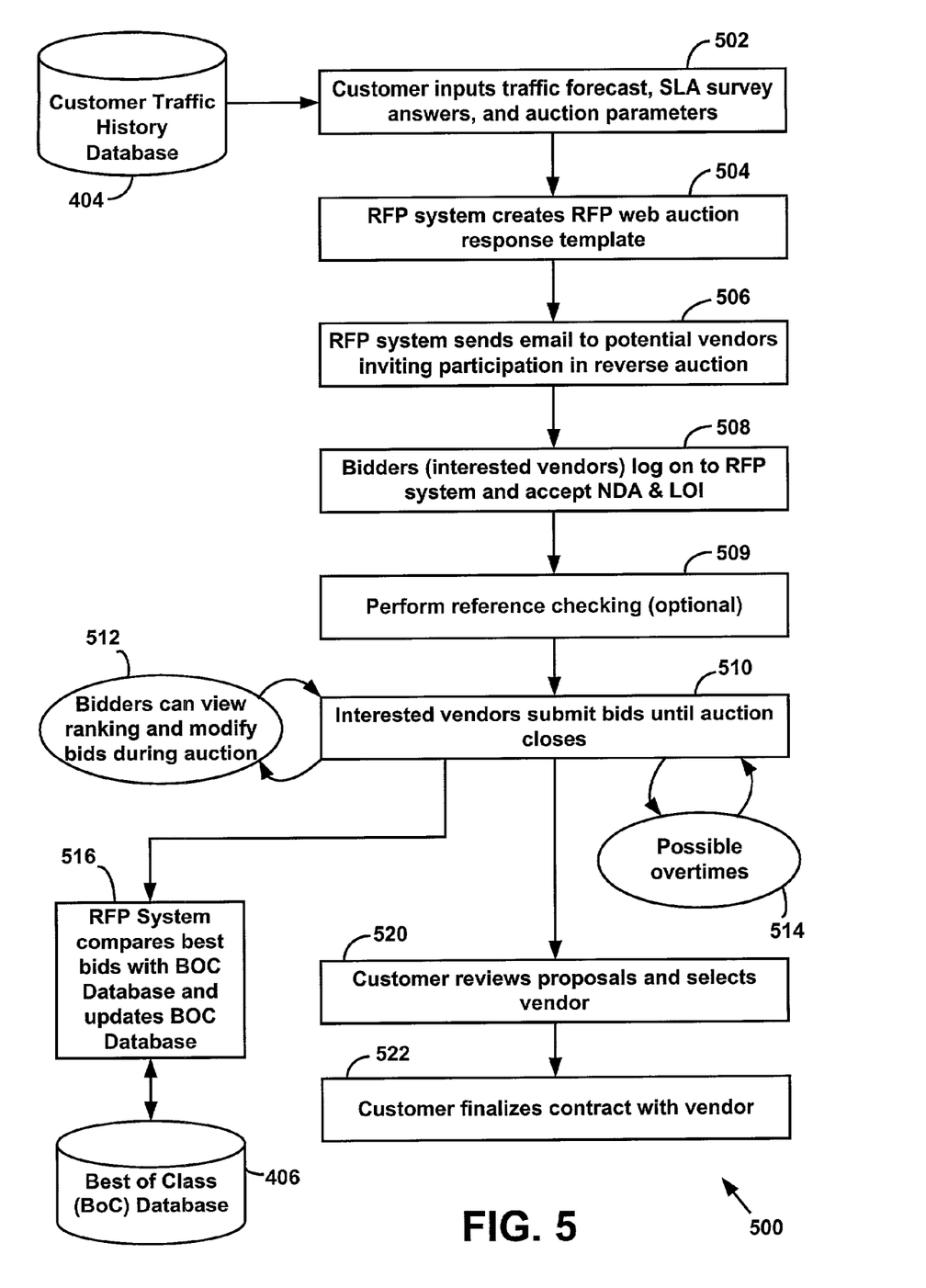
FIGS. 5 and 6 are flow diagrams depicting a method of preparing an RFP, conducting a reverse auction, and updating a Best of Class database using the RFP system of FIG. 4.

FIG. 5 is a flow diagram depicting a preferred method of preparing an RFP, conducting a reverse auction, and updating BOC databases 206, 406 using RFP system 400 of FIG. 4. With reference to FIG. 5, the customer begins an RFP process 500 by inputting a traffic needs forecast and completing a service level agreement (SLA) questionnaire (step 502). The traffic needs forecast can be based on historical traffic data uploaded from customer traffic history database 404, which may comprise customer traffic history database 204 updated in connection with use of spending analysis system 200.

Figure 6:
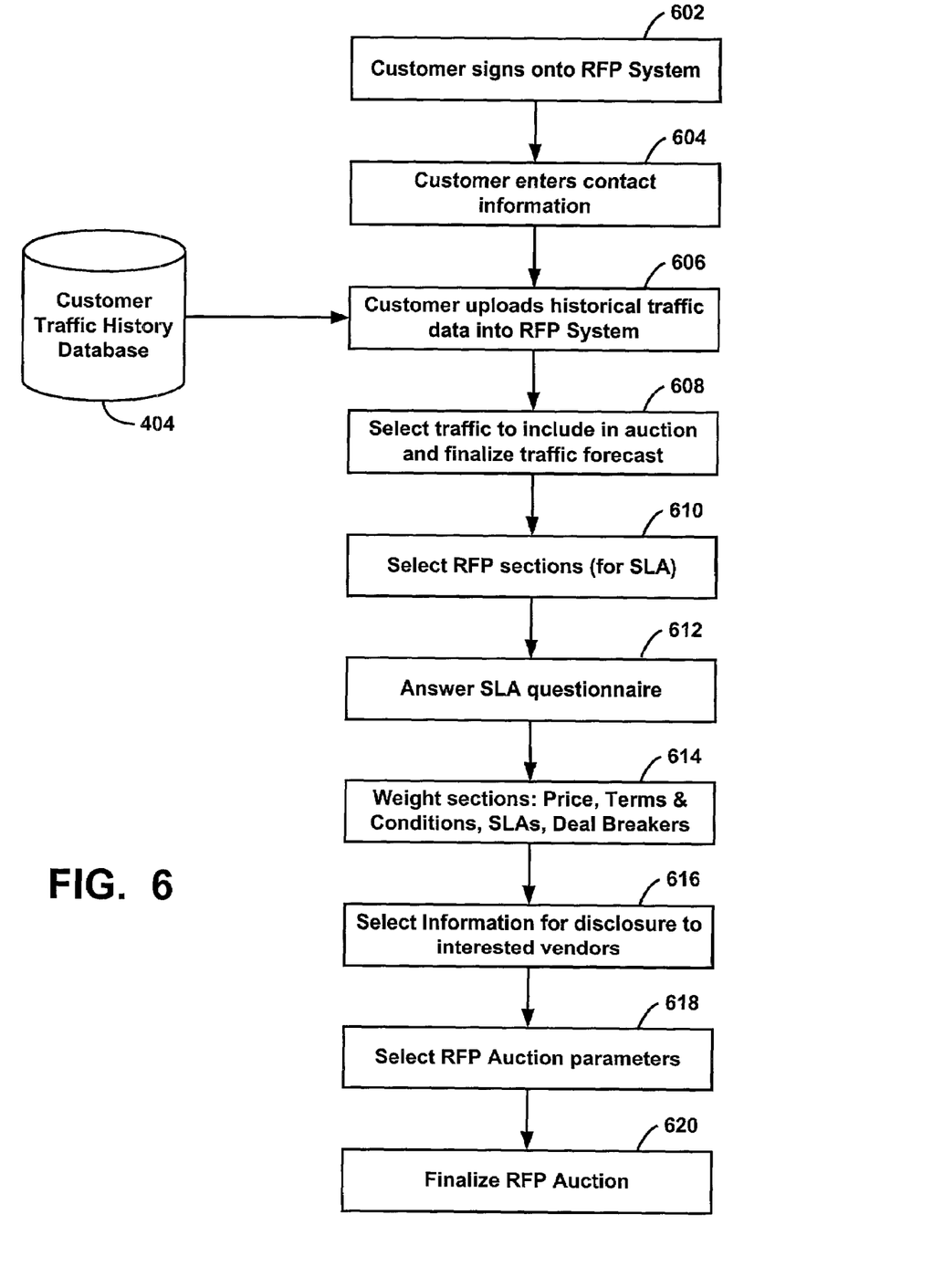

FIG. 6 is a flow diagram detailing step 502 of FIG. 5, the steps by which the customer inputs the RFP traffic forecasts and SLA questions using RFP system 400. With reference to FIG. 6, the customer begins the input process by signing on to RFP web server 402 using a user name and password (step 602). The customer then enters contact information, including an email address for the person to contact in connection with the RFP process (step 604). RFP web server 402 prompts the customer to input a traffic use forecast, either manually (not shown) or by uploading historical traffic data from customer traffic history database 404 (step 606). The customer can then select particular classes of service to include in the reverse auction (step 608). By default, RFP web server 402 calculates an annual traffic use forecast based on the past year of the client's use of the selected class of service. Alternatively, RFP web server 402 can adjust the forecast over past use based on a user-defined growth factor.

After the traffic forecast has been completed (step 608), RFP system 400 prompts the customer to select predefined groups of SLA questions called "sections" (step 610) and to input "answers" to SLA questions in the selected sections (step 612). "Answering" the SLA questions may involve merely selecting or deselecting predefined questions for inclusion in or exclusion from the RFP. The sections, which may be divided into subsections of SLA questions, are then weighted by the customer (step 614), for example, by selecting an importance factor ranging from 1 to 5. Individual SLA questions may also be weighted by selecting an importance factor ranging from 1 to 5. Examples of sections are "Account Management" and "General Terms and Conditions." Subsections within the Account Management section might include, for example, "Contract Implementation" and "Ongoing Customer Support." SLA questions in Account Management/Ongoing Customer Support subsection might include the following questions, for example:

"a. Will you provide a dedicated Account Team that will service all of Customer's needs for the duration of the contract?
"b. Will you also provide a single point of contact responsible for overall management of the service?
"c. Do you agree to provide a response to each and every Customer-generated e-mail within 24 hours?
"d. Will you provide live telephone answering which originates within each Supplier contact's office?
"e. Will you provide live operator access via dialing zero at any point in a voice mail or auto-attendant prompt?
"f. Will you provide multi-lingual support to all Customer sites 24 hours/day, 7 days/week?
"g. Will you provide an escalation list for ongoing Customer support, including contact names, titles, direct office phone numbers, mobile phone numbers, pager numbers, e-mail addresses, escalation intervals, and escalation procedures?"

Those skilled in the art will understand that thousands of other SLA questions can be implemented in a similar manner, in various sections and subsections. Such questions specify requested contract terms, which may later become part of the telecommunications contract. However, the SLA questions are not necessarily so restrictive. While some or all of the questions may request a binary "yes" or "no" answer, others may invite comments, data, references, and any other information that may be useful to the customer in making a contract selection decision.

RFP system 400 can be used for products and services other than telecommunications carrier services. For example, products such as computers, networking devices, telephones, and office equipment can be included in the RFP for bidding by interested vendors. Because some vendors sell both telecommunications services and other products (telephones, switches, modems, etc.), RFP system 400 can also be used for soliciting bids on packages of telecommunications services and other products. As used herein, the term "commodities" shall mean products, services, or a combination thereof.

In addition to the traffic forecast, SLA questions, and other information described above, RFP system 400 also prompts the customer to select the extent to which information about the auction and the bidding status will be disclosed to interested vendors (step 616). For example, the customer may choose whether to reveal the customer's name. The customer may also choose whether bidders will know each others' names. The customer is also prompted to choose whether to disclose to vendors the section and subsection rankings, question rankings, and overall rankings of their bids. RFP system 400 prompts the customer to select auction parameters, such as a starting date and duration of the auction, the vendors that will be invited to participate, whether vendor reference checking will be performed, whether overtimes will be allowed, the circumstances that will trigger overtimes, and the number and duration of overtimes (step 618). The auction parameters may also include reference checking for all interested vendors.

If the customer desires vendor reference checking to be performed, a reference checking subsystem of the RFP system 400 prompts the customer for a required number of reference individuals that interested vendors will be required identify before bidding in the auction. The customer is also prompted by the reference checking subsystem to select and/or define reference feedback questions that the reference individuals will be asked to answer. As with the SLA questions, the customer may choose to include the responses to the reference feedback questions in the calculation of vendor scores, and to weight the reference feedback questions in accordance with their importance to the customer.

A verification routine of RFP web server 402 is activated by the customer after completion of the RFP to verify that all necessary information has been entered. If not, the verification routine flags the missing information and alerts the customer before allowing the RFP to be finalized. When the customer is ready to finalize the RFP and release it for bidding, RFP web server 402 prompts the customer to confirm that the RFP is ready for release to potential vendors (step 620).

Again referring to FIGS. 4 and 5, once the customer has completed the traffic forecast, SLA survey, and auction parameters (step 502), RFP system 400 generates an RFP web auction response template (step 504). The response template is then stored on RFP database 408 for later access via RFP web server 402 by interested vendors using vendor computers 420. Once the customer has confirmed a decision to release the RFP auction, RFP system 400 sends an email invitation to each potential vendor (step 506). The email invitation includes a uniform resource locator (URL) that uniquely identifies a web page login into a reverse auction environment of RFP web server 402. The web page login prompts the interested vendor to input a vendor name and password that has been assigned to the vendor by RFP system 400 and supplied in the email in step 506. Immediately after signing on to RFP web server 402, the interested vendor is prompted to agree to a nondisclosure agreement (NDA) and letter of intent (LOI) that include terms of participation in the RFP web auction (step 508).

If the customer has opted for vendor reference checking to be performed, the reference checking subsystem asks the interested vendor to provide names and email addresses for the required number of reference individuals (step 509). The reference checking subsystem then generates email messages to the reference individuals, inviting the reference individuals to provide reference feedback on the interested vendor. The email requests include instructions and passwords for accessing a reference feedback page of the RFP web site, where the reference individuals will be prompted to answer the reference feedback questions.

After the interested vendor agrees to the terms of the NDA and LOI (step 508) and identifies the required number of reference individuals (step 509), RFP system 400 presents the RFP to the interested vendor for bidding (step 510). RFP system typically provides limited options for responding to the SLA questions—typically in the form of radio buttons and drop down menus. Freeform input is restricted to prevent interested vendors from flooding the customer with unwanted sales and advertising information. The interested vendor is also prompted by RFP web server 402 to bid on the various services and products included in the RFP. An email form within the RFP site allows the vendor to submit questions that are forwarded by RFP system 400 to the customer via email.

RFP system 400 will save the accumulated vendor responses if the vendor chooses to exit the system prematurely, allowing the vendor to resume completion of the SLA questions and bids at a later time. Since the input is made via a secure web site, RFP system 400 also facilitates division of responsibility at the vendor for answering the various questions and providing the bid prices. A verification and bid submission security page allows final bid completion and submission to be controlled by only those persons at the vendor with the necessary bid submission password (which may be different from the account password). Upon completion and submission of a bid, the RFP system 400 generates a status email to the interested vendor that confirms receipt of the bid. The status email can, at the customer's option, include ranking information generated by a bid analysis module that analyzes the bid relative to other interested vendors and BOC database 406. Once the bid is submitted, the interested vendor can then review its bid, view its ranking on the RFP web site, and submit modified bids (step 512). Upon receipt of the bid, RFP system 400 can also send a generic bid notification email to all of the potential vendors. The bid notification email does not identify the bidder, but gives the potential vendors an opportunity to respond with a more competitive bid.

As described in step 618 (FIG. 6), the customer can designate one or more overtimes 514 to extend the deadline for submitting bids beyond the scheduled auction end time. The customer can choose to have one or more overtimes triggered in selected circumstances, such as when multiple bidders have submitted competitive bids near the end of the auction. Overtimes are beneficial to the customer because they encourage bidding wars, which drive down prices.

Upon completion of the reverse auction, a database update module of RFP system 400 compares the best bids for the various services and products included in the RFP against the corresponding estimated market rates stored in BOC database 406 (step 516). If appropriate, the database update module updates BOC database 406 with rates and other bid information. The customer has an opportunity to review the final proposals submitted by interested vendors and to review auction summary information, such as graphs of the bid prices over time (step 520). The customer then selects one or more of the proposals and contacts the submitting vendor(s) to negotiate and finalize one or more service contracts (step 522).

It will be obvious to those having skill in the art that many changes may be made to the details of the above-described embodiment of this invention without departing from the underlying principles thereof. The scope of the present invention should, therefore, be determined only by the following claims.

The invention claimed is:

1. A method of updating a database of commodity information, comprising:
providing an online reverse auction environment accessible via a computer network;
providing a database of commodity information comprising predefined commodity designations representing predefined commodities, and an estimated market price stored in association with one or more of the predefined commodity designations, wherein the estimated market price is formed as a function of historical pricing information not obtained via the online reverse auction environment, and wherein the estimated market price is not known to a vendor of the online reverse auction environment;
receiving a request for proposals (RFP) accessible via a computer network from a customer at the online reverse auction environment, the RFP including a request for bids on at least one specified commodity of the predefined commodities;
soliciting multiple potential vendors accessible via a computer network to submit proposals responsive to the RFP in the online reverse auction environment;
receiving one or more vendor proposals in the online reverse auction environment, at least one or more of the vendor proposals being responsive to the RFP and including a proposed price for the at least one specified commodity;
extracting the proposed price for the at least one specified commodity from each of the responsive vendor proposals;
comparing the proposed price for the at least one specified commodity to the estimated market price of the at least one specified commodity; and
updating the database, after closing the online reverse auction environment, with the proposed price for the at least one specified commodity if the proposed price is less than the estimated market price so the estimated market price more accurately approximates an actual market price.

2. The method of claim 1 in which the estimated market price has an age and the updating of the database includes updating the estimated market price when age of the estimated market price exceeds a predetermined expiration age.

3. The method of claim 1 in which:
the RFP includes an anticipated quantity of the at least one specified commodity;
the database includes a volume-based estimated market price for each of multiple predefined quantity ranges of each of the predefined commodities, at least one of the predefined quantity ranges corresponding to the anticipated quantity of the at least one specified commodity of the RFP; and
the comparison of the proposed price to the estimated market price includes comparing the proposed price to the volume-based estimated market price corresponding to the anticipated quantity of the at least one specified commodity.

4. The method of claim 1 in which the at least one specified commodity includes telecommunications services.

5. The method of claim 1 in which the database includes one or more nonprice market terms for each of the predefined commodities.

6. The method of claim 5 in which the nonprice market term is associated with a combination of:
(a) one or more of the predefined commodities, and
(b) the estimated market price for the one or more of the predefined commodities.

7. The method of claim 5 in which the nonprice market terms are selected from the group consisting of:
(a) contract duration;
(b) quality of service;
(c) refund policies;
(d) warranties;
(e) customer service response time;
(f) customer service escalation obligations;
(g) multilingual support services;
(h) e-mail response services;
(i) exclusivity terms;
(j) discounts;
(k) installation fees;
(l) risk allocation;
(m) contract renewal terms;
(n) contract termination conditions; and
(o) any combination of (a) to (n).

8. A method of updating a database of commodity information, comprising:
providing an online reverse auction environment accessible via a computer network;
providing a database of commodity information comprising multiple predefined commodity designations representing multiple predefined commodities, an estimated market price stored in association with at least one of the commodity designations, and a nonprice market term stored in associated with one or more of the commodity designations, wherein the estimated market price is formed as a function of historical pricing information not obtained via the online reverse auction environment, and wherein the estimated market price is not known to a vendor of the online reverse auction environment;
receiving a request for proposals (RFP) accessible via a computer network from a customer at the online reverse auction environment, the RFP including a request for bids and a desired nonprice term for at least one specified commodity of the predefined commodities;
soliciting multiple potential vendors accessible via a computer network to submit proposals responsive to the RFP in the online reverse auction environment;
receiving one or more vendor proposals in the online reverse auction environment, at least one of the one or more vendor proposals being responsive to the RFP and including a proposed price for the at least one specified commodity and a proposed nonprice term;
extracting the proposed price and the proposed nonprice term from the at least one responsive vendor proposals;
comparing the proposed price and the proposed nonprice term with the respective estimated market price and nonprice market term of the database corresponding to the at least one specified commodity; and
updating the database, after closing the online reverse auction environment, with the proposed price for the at least one specified commodity if the proposed price is less than the estimated market price so the estimated market price more accurately approximates an actual market price.

9. The method of claim 8 in which the estimated market price has an age and the updating of the database includes updating the estimated market price when the age of the estimated market price exceeds a predetermined expiration age.

10. The method of claim 8 in which:
the RFP includes an anticipated quantity of the at least one specified commodity;
the database includes a volume-based estimated market price for each of multiple predefined quantity ranges of each of the predefined commodities, at least one of the quantity ranges corresponding to the anticipated quantity of the at least one specified commodity of the RFP; and
the comparison of the proposed price to the estimated market price includes comparing the proposed price to the volume-based estimated market price corresponding to the anticipated quantity of the at least one specified commodity.

11. The method of claim 8 in which the at least one specified commodity includes telecommunications services.

12. The method of claim 8 in which the nonprice market term is associated with a combination of:
(a) one or more of the predefined commodities, and
(b) the estimated market price for the one or more of the predefined commodities.

13. The method of claim 8 in which the nonprice market terms are selected from the group consisting of:
(a) contract duration;
(b) quality of service;
(c) refund policies;
(d) warranties;
(e) customer service response time;
(f) customer service escalation obligations;
(g) multilingual support services;
(h) e-mail response services;
(i) exclusivity terms;
(j) discounts;
(k) installation fees;
(l) risk allocation;
(m) contract renewal terms;
(n) contract termination conditions; and
(o) any combination of (a) to (n).

14. A computer system for facilitating the purchase of telecommunications services, comprising:
a best of class database including an estimated market price for at least one telecommunications service;
a customer traffic history database including traffic information describing a historical quantity of the at least one telecommunications service used by a customer during a previous time period;
an RFP preparation module accessible by the customer via the Internet for preparation of a request for proposals (RFP) describing an anticipated quantity of the at least one telecommunications service, the RFP preparation module being adapted to extract the historical quantity from the customer traffic history database for use in determining the anticipated quantity of the at least one telecommunications service;
an online reverse auction environment, accessible by multiple potential vendors via the Internet, the potential vendors including one or more interested vendors, the online reverse auction environment adapted to display the RFP to the one or more interested vendors and to receive bids on the RFP from the one or more interested vendors;

a bid analysis module in communication with the online reverse auction environment and the best of class database for analyzing the received bids, and a database updating module for updating the best of class database, after a close of the online reverse auction environment, with at least one of the received bids if such received bid is less than the estimated market price so the estimated market price more accurately approximates an actual market price, wherein the estimated market price is formed as a function of historical pricing information not obtained via the online reverse auction environment, and wherein the estimated market price is not known to the potential vendors.

15. The system of claim 14 in which the online reverse auction environment includes security for admitting potential vendors only with a valid username and password.

16. The system of claim 14 in which the bid analysis module is configured to provide a feedback in response to receipt of a new bid at the online reverse auction environment.

17. The system of claim 16 in which the feedback includes a ranking of the new bid relative to the bids previously received at the online reverse auction environment.

18. The system of claim 17 in which the feedback is provided to the one or more interested vendor that submitted the new bid.

19. The system of claim 16 in which the feedback is provided via email to the one or more interested vendors that have submitted bids previous to the new bid.

20. The system of claim 16 in which the feedback is provided via email to the potential vendors.

21. The system of claim 14, further comprising a reference checking subsystem for receiving from each of the one or more interested vendors an email address of a reference individual and for receiving from the reference individual a reference feedback concerning the one or more interested vendors.

22. The system of claim 14 in which:
the best of class database includes a volume-based estimated market price for each of multiple predefined quantity ranges of each of the telecommunications services, at least one of the quantity ranges corresponding to the anticipated quantity of the telecommunications service; and
the bid analysis module is adapted to compare the received bid with the volume-based estimated market price corresponding to the anticipated quantity.

23. The system of claim 14 in which:
the database includes one or more nonprice market terms for the telecommunications services;
the RFP preparation module prompts the customer for one or more desired nonprice terms; and
the online reverse auction environment prompts the interested vendors for responses to the desired nonprice terms as part of the bids of the one or more interested vendors.

24. The system of claim 23 in which the bid analysis module is adapted to analyze the responses to the desired nonprice terms when analyzing the received bids.

25. A computer system for facilitating the purchase of telecommunications services, comprising:
a best of class database including an estimated market price for at least one telecommunications service;

a customer traffic history database including traffic information describing a historical quantity of the telecommunications service used by a customer during a previous time period;

an RFP preparation module accessible by the customer via the Internet for preparation of a request for proposals (RFP) describing an anticipated quantity of the telecommunications service, the RFP preparation module being adapted to extract the historical quantity from the customer traffic history database for use in determining the anticipated quantity of the telecommunications service;

an online reverse auction environment accessible by multiple potential vendors via the Internet, the potential vendors including one or more interested vendors, the online reverse auction environment adapted to present the RFP to the one or more interested vendors and to receive bids on the RFP from the one or more interested vendors;

a bid analysis module in communication with the online reverse auction environment and the best of class database for analyzing the received bids and generating a feedback in response to the received bids; and a database updating module for updating the best of class database, after a close of the online reverse auction environment, with at least one of the received bids if such received bid is less than the estimated market price so that the estimated market price more accurately approximates an actual market price, wherein the estimated market price is formed as a function of historical pricing information not obtained via the online reverse auction environment, and wherein the estimated market price is not known to the potential vendors.

26. The system of claim 25 in which the online reverse auction environment includes security for admitting potential vendors only with a valid username and password.

27. The system of claim 25 in which the feedback is provided to the one or more interested vendors that submitted the received bid.

28. The system of claim 25 in which the feedback is provided via email to the potential vendors.

29. The system of claim 25 in which:
the received bids include a newly received bid and a previously received bid; and
the feedback includes a ranking of the newly received bid relative to the previously received bid.

30. The system of claim 29 in which the feedback is provided to the one or more interested vendor that submitted the previously received bid.

31. The system of claim 25, further comprising a reference checking subsystem for receiving from each of the one or more interested vendors an email address of a reference individual and for receiving from the reference individual a reference feedback concerning the one or more interested vendors.

32. The system of claim 25 in which:
the best of class database includes a volume-based estimated market price for each of multiple predefined quantity ranges of each of the telecommunications services, at least one of the quantity ranges corresponding to the anticipated quantity of the telecommunications service; and
the bid analysis module is adapted to compare the received bid with the volume-based estimated market price corresponding to the anticipated quantity.

33. The system of claim 25 in which:
the RFP preparation module prompts the customer for one or more desired nonprice terms; and the online reverse auction environment prompts the one or more interested vendors for responses to the desired nonprice terms as part of the bids of the one or more interested vendors.

34. The system of claim 33 in which the bid analysis module is adapted to analyze the responses to the desired nonprice terms when analyzing the received bids.

35. The system of claim 33 in which:
the best of class database includes one or more nonprice market terms for the telecommunications services; and
the database updating module is adapted to update the estimated market price and the nonprice market terms of the best of class database.

36. A computer system for reducing the cost of telecommunications services, comprising:
a best of class database including multiple generic classes of telecommunications service and an estimated market price for one or more of the generic classes of telecommunications service;
a customer traffic history database including traffic information describing a historical quantity of at least some of the generic classes of telecommunications service used by a customer during a previous time period;
a spending analysis software module for reading multiple telecommunications billing statements including traffic detail data, extracting the traffic detail data from the telecommunications billing statements, converting the traffic detail data to the generic classes of telecommunications service, and updating the historical quantity of the customer traffic history database with the converted traffic detail data;
an RFP preparation module accessible by the customer via the Internet for preparation of a request for proposals (RFP) describing an anticipated quantity of a specified one of the generic classes of telecommunications service, the RFP preparation module being adapted to extract the historical quantity from the customer traffic history database for use in determining the anticipated quantity of the specified generic class of telecommunications service;
an online reverse auction environment accessible by multiple potential vendors via the Internet, the potential vendors including one or more interested vendors, the online reverse auction environment adapted to present the RFP to the one or more interested vendors and to receive bids on the RFP from the one or more interested vendors;
a bid analysis module in communication with the online reverse auction environment and the best of class database for analyzing the received bids and generating a feedback in response to the received bids; and
a database updating module for updating the best of class database, after a close of the online reverse auction environment, with at least one of the received bids if such received bid is less than the estimated market price so that the estimated market price more accurately approximates an actual market price, wherein the estimated market price is formed as a function of historical pricing information not obtained via the online reverse auction environment, and wherein the estimated market price is not known to the potential vendors.

37. The system of claim 36 in which the feedback is provided to the one or more interested vendors that submitted the received bid.

38. The system of claim 36 in which the feedback is provided via email to the potential vendors.

39. The system of claim 36 in which:
the received bids include a newly received bid and a previously received bid; and
the feedback includes a ranking of the newly received bid relative to the previously received bid.

40. The system of claim 37 in which the feedback is provided to the one or more interested vendors that submitted the previously received bid.

41. The system of claim 36, further comprising a reference checking subsystem for receiving from each of the one or more interested vendors an email address of a reference individual and for receiving from the reference individual a reference feedback concerning the one or more interested vendors.

42. The system of claim 36 in which:
the best of class database includes a volume-based estimated market price for each of multiple predefined quantity ranges of each of the generic classes of telecommunications services, at least one of the quantity ranges corresponding to the anticipated quantity of the specified generic class of telecommunications service; and
the bid analysis module is adapted to compare the received bid with the volume-based estimated market price corresponding to the anticipated quantity.

43. The system of claim 36 in which:
the RFP preparation module prompts the customer for one or more desired nonprice terms; and
the online reverse auction environment prompts the one or more interested vendors for responses to the desired nonprice terms as part of the bids of the interested vendors.

44. The system of claim 43 in which the bid analysis module is adapted to analyze the responses to the desired nonprice terms when analyzing the received bids.

45. The system of claim 43 in which:
the best of class database includes one or more nonprice market terms for each of the generic classes of telecommunications services; and
the database updating module is adapted to update the estimated market price and the nonprice market terms of the best of class database.

46. A computer-implemented method of analyzing telecommunications traffic, comprising:
extracting traffic detail data from multiple billing statements, the billing statements being received from various telecommunications carriers, the traffic detail data of each billing statement describing at least one telecommunications traffic event;
converting the traffic detail data to a generic traffic format, the generic traffic format defining multiple generic classes of service;
storing the converted traffic detail data in a customer traffic history database;
summarizing the converted traffic detail data;
providing a best of class database including an estimated market price for one or more of the generic classes of service;
analyzing the traffic detail data to determine an actual cost of the telecommunications traffic; and
comparing the actual cost to the estimated market price, wherein the estimated market price is formed as a function of historical pricing information obtained via at least one previously performed online reverse auction, and wherein the estimated market price is not known to a vendor of the online reverse auction.

47. The method of claim 46, further comprising generating an RFP recommendation notice when the actual cost exceeds the estimated market price.

48. The method of claim 46, further comprising updating the best of class database based on the actual cost.

49. The method of claim 44 in which:
the traffic detail data includes, for each telecommunications traffic event, a traffic direction, a type of service, a boundary type, and an applicable carrier rate schedule; and
the converting of traffic detail data to the generic traffic format includes applying a predefined set of translation rules that relate the traffic detail data to a set of predefined generic classes of service based on the traffic direction, the type of service, the boundary type, and the applicable rate schedule of the traffic detail data.

50. The method of claim 49 in which the converting of the traffic detail data to the generic traffic format includes:
providing a traffic classification conversion table including the multiple generic classes of service and associated with carrier-dependent traffic detail characteristics; and
for each telecommunications traffic event, identifying in the traffic classification conversion table a matching one of the generic classes of service associated with the carrier-dependent traffic characteristics that correspond to the traffic direction, the type of service, the boundary type, and the applicable rate schedule of the telecommunications traffic event.

51. The method of claim 49 in which:
the traffic direction is selected from the group consisting of incoming and outgoing;
the type of service is selected from the group consisting of voice, paging, cellular, and data transmission; and
the boundary type is selected from the group consisting of interstate, inter-LATA, and international.

52. The method of claim 46 in which a first one of the telecommunications carriers provides services under a contract including a minimum target quantity for a contracted class of the generic classes of service, the method further comprising:
analyzing the converted traffic detail data of the first telecommunications carrier to identify a projected traffic deficit relative to the minimum target quantity; and
analyzing the converted traffic detail data of a second one of the telecommunications carriers to identify a future surplus traffic volume corresponding to the contracted class of the first telecommunications carrier.

53. The method of claim 52, further comprising rerouting the future surplus traffic volume to the first telecommunications carrier to thereby reduce the projected traffic deficit.

54. The method of claim 46 in which a contracting one of the telecommunications carriers provides services under a contract including a contracted service order fee, the method further comprising:
analyzing the billing statement to identify a service order event including a billed order fee;
comparing the billed order fee with the contracted service order fee to identify a service order fee discrepancy; and
notifying the customer of the service order fee discrepancy.

55. The method of claim 54, further comprising automatically generating a message to the contracting telecommunications carrier in response to the existence of the service order fee discrepancy, the message requesting adjustment of the billed order fee.

56. A computer-implemented telecommunications spending analysis system for analyzing multiple telecommunications billing statements received by a customer from various telecommunications carriers, each telecommunications billing statement including traffic detail data for multiple telecommunications traffic events, comprising:
a set of computer-readable translation rules that relate the traffic detail data to multiple predefined generic classes of service;
a traffic genericizing module for converting the traffic detail data to a generic traffic detail format in accordance with the translation rules;
a customer traffic history database for storing the converted traffic detail data;
a traffic analysis software module in communication with the customer traffic history database for analyzing the converted traffic detail data to thereby allow convenient summarizing, storage, and reporting of the traffic detail data; and
a best of class database including an estimated market price for one or more of the generic classes of service, and in which the traffic analysis software module is adapted to analyze the traffic detail data to determine an actual cost of the telecommunications traffic and compare the actual cost to the estimated market price, wherein the estimated market price is formed as a function of historical pricing information obtained via at least one previously performed online reverse auction, and wherein the estimated market price is not known to a vendor of the online reverse auction.

57. The system of claim 56 in which the traffic genericizing module is operable on a personal computer.

58. The system of claim 56 in which the customer traffic history database is accessible via the Internet for storing the converted traffic detail data.

59. The system of claim 56 in which the traffic analysis software module is accessible remotely via the Internet using a web browser.

60. The system of claim 56 in which the translation rules relate the traffic detail data to the generic classes of service on the basis of a traffic direction, a type of service, a boundary type, and an applicable carrier rate schedule of each telecommunications traffic event.

61. The system of claim 60 in which:
the traffic direction is selected from the group consisting of incoming and outgoing;
the type of service is selected from the group consisting of voice, paging, cellular, and data transmission; and
the boundary type is selected from the group consisting of interstate, inter-LATA, and international.

62. The system of claim 61 in which the traffic analysis software module generates an RFP recommendation notice when the actual cost exceeds the estimated market price.

63. The system of claim 56 in which:
a first one of the telecommunications carriers provides services under a contract including a minimum target quantity for a contracted class of the generic classes of service;
the traffic analysis software module is adapted to analyze the converted traffic detail data of the first telecommunications carrier to identify a projected traffic deficit relative to the minimum target quantity; and
the traffic analysis software module is adapted to analyze the converted traffic detail data of a second one of the telecommunications carriers to identify a future surplus traffic volume corresponding to the contracted class of the first telecommunications carrier.

64. The system of claim 63 in which the traffic analysis software module sends a traffic redirection suggestion message to the customer in response to the existence of the projected traffic deficit and the surplus traffic volume, the traffic redirection suggestion message identifying the future surplus traffic volume and recommending a routing change to direct the future surplus traffic volume to the first telecommunications carrier and to thereby reduce the projected traffic deficit.

65. The system of claim 56, further comprising a contract terms database including terms of a service contract between the customer and a contracting one of the telecommunications carriers, the service contract including a contracted service order fee, and in which the traffic analysis software module is adapted to analyze the billing statement to identify a service order event including a billed order fee, compare the billed order fee with the contracted service order fee to identify a service order fee discrepancy, and notify the customer of the service order fee discrepancy.

66. The method of claim 65 in which the traffic analysis software module automatically generates a message to the contracting telecommunications carrier in response to the existence of the service order fee discrepancy, the message requesting adjustment of the billed order fee.

* * * * *